No. 758,472. Patented April 26, 1904.

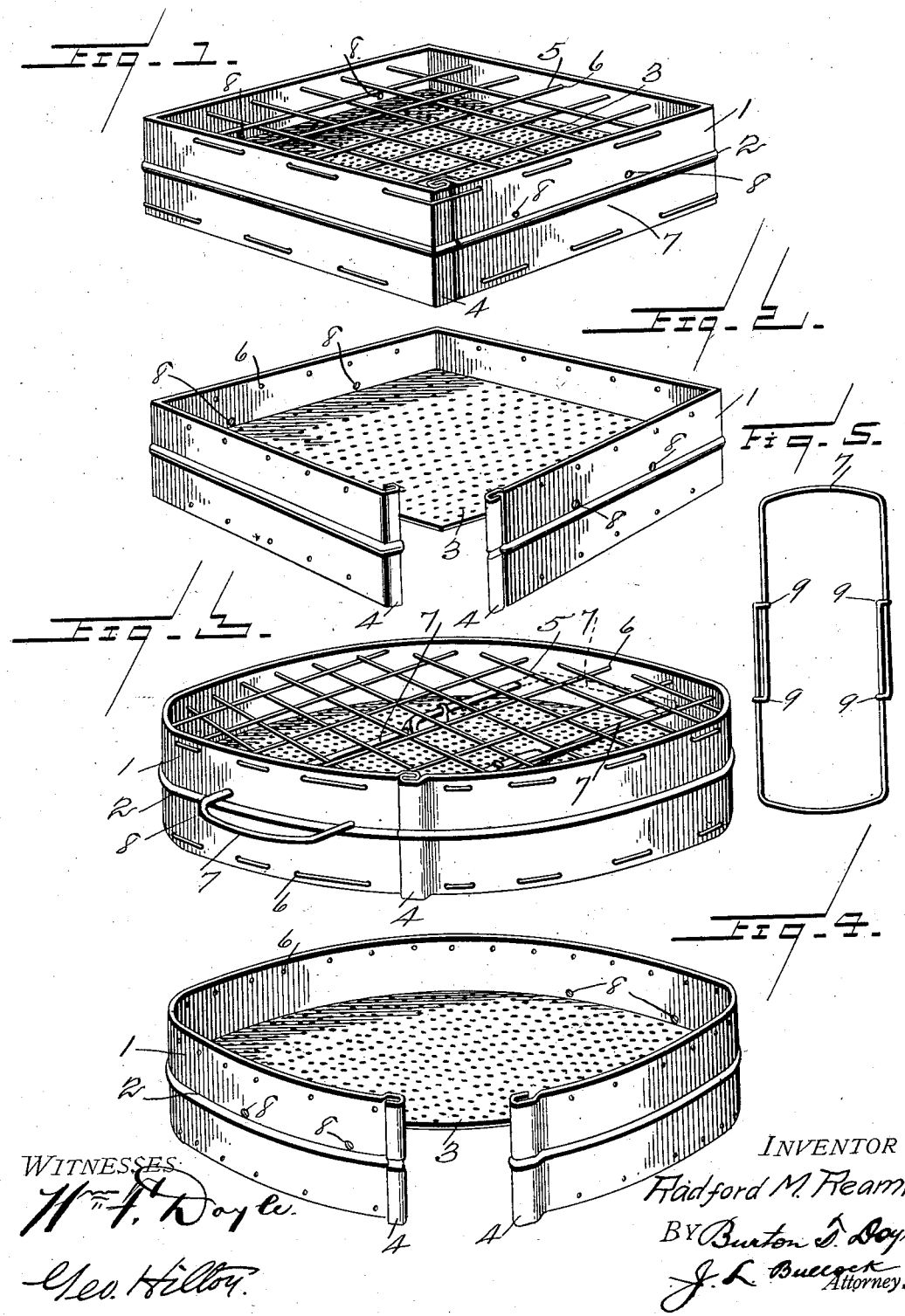

UNITED STATES PATENT OFFICE.

RADFORD MONROE REAMS, OF McMINNVILLE, TENNESSEE.

BREAD-TOASTER.

SPECIFICATION forming part of Letters Patent No. 758,472, dated April 26, 1904.

Application filed August 4, 1903. Serial No. 168,149. (No model.)

*To all whom it may concern:*

Be it known that I, RADFORD MONROE REAMS, a citizen of the United States, residing at McMinnville, in the county of Warren and State of Tennessee, have invented certain new and useful Improvements in Bread-Toasters, of which the following is a specification.

My present invention relates to implements for toasting bread; and its object is to produce a bread-toaster which will be handy, durable, and inexpensive.

Another object of my invention is to produce an implement of the character described which may be used for toasting bread over any kind of heat.

Another object of my invention is to produce an implement of the character described which will be compactly built, of small dimensions, and occupy but little space.

I attain these and other objects not specifically enumerated by means of the construction, combination, and arrangement of parts explained in the specification, pointed out in the claims, and illustrated in the accompanying drawings, which form a part of this specification, and in which—

Figure 1 is a perspective view of one of my toasters made in rectangular shape and ready for use. Fig. 2 is a perspective view of one of my toasters made in rectangular shape and only partly finished, the ends of the outer piece being unseamed and the wire lacing being left off. Figs. 3 and 4 are the same, respectively, as Figs. 1 and 2 when the toaster is made of circular contour; and Fig. 5 is a detail view of the handle, which I may use with inwardly and outwardly sliding effect on one of my toasters for convenience in moving the same.

Like characters of reference denote like parts wherever they occur throughout the various views of the drawings.

1 is a strip of sheet metal cut of the desired length and width.

2 is an outwardly-disposed bead-groove made about the center and lengthwise of said strip of sheet metal.

3 is a perforated piece of sheet metal around which said strip of sheet metal is bent in such manner as to let the edge of the former rest in and be held in place by said bead-groove.

4 is a lock-jointed seam or other solderless means by which the ends of the strip of sheet metal are fastened securely around the perforated center piece.

5 is a wire which is woven across the upper and lower faces of the device, formed by bending the strip of sheet metal around the perforated center piece. This wire is woven in an intersecting manner across these faces by being passed through a series of holes made through the strip of sheet metal near its upper and lower edges or being made to rest in notches in such upper and lower edges, for while only the holes are shown the notches may be used, if I prefer them. The object of this perforated center piece is an even distribution of the heat over the surface to be toasted, and the object of this wire lacing is threefold: It braces and strengthens the whole device, it holds the perforated center-piece more rigidly in place by preventing any giving away in the encircling rim-piece, and it provides on the one side a rest for the article to be toasted and on the other means for supporting the toaster when it is used over a lamp or other heating apparatus smaller in diameter than the toaster itself.

6 is a series of holes made through the encircling strip near its upper and lower edges or a like series of notches made in such upper and lower edges for the accommodation of the wire lacing.

7 is a sliding handle, Fig. 5, which is passed through the holes 8 8 8 8, two each on opposite sides of the strip of sheet metal after it has been secured around the perforated center piece, and 9 9 are sliding joints connecting the inner ends of the two U-shaped wire pieces used in forming such sliding handle. These two U-shaped pieces of wire are passed through the holes 8 8 8 8 on opposite sides of the device formed by bending the strip of sheet metal around the perforated center piece and having their arms mutually connected by having the ends of each bent around the arms of the other, so that such handle may be pushed in or pulled out by means of the sliding joints thus formed.

While I have shown both a circular and a rectangular contour, I may use any shape of contour I please to use having the perforated center piece of like contour. While I have shown the wire lacing as passed through holes made through the encircling strip of sheet metal near its upper and lower edges, I may let it rest in notches made in such upper and lower edges, if I prefer that form, or I may use any other suitable means for holding the wire lacing in place, and while I have shown only a lock-jointed seam for connecting the meeting ends of the encircling strip of sheet metal I may use any other solderless means for securing such ends together.

In making my toaster the strip of sheet metal is first cut of the desired width and length, the bead-groove and the holes for the handles and the holes or notches for the wire lacing are made, the perforated center piece is cut of the desired shape and size, the strip is passed around the center piece, the edge of the latter resting in the groove of the former, and the meeting ends of the former are secured together without the use of solder. The two U-shaped pieces of wire are then inserted through proper holes and connected together by the sliding joints already described, and the wire lacing is then put on.

Having thus fully described my invention and without meaning to be restricted to the exact construction shown and described, what I claim, and desire to secure by Letters Patent, is—

1. An implement for toasting bread, comprising a rim-piece provided on its inner surface between its edges with a groove and near its edges with holes, a perforated metallic diaphragm resting in said groove and woven-wire supports secured to the upper and lower portions of said rim-piece by passing the wire thereof through said holes, substantially as described.

2. In implements for toasting bread, the combination, with a rim-piece provided on its inner surface between its edges with a groove and near its edges with holes, a perforated metallic diaphragm resting in said groove and woven-wire supports secured to the upper and the lower portions of said rim-piece by passing the wire thereof through said holes, of inwardly and outwardly sliding handles consisting of two U-shaped metal pieces inserted through holes on opposite sides of the rim-piece and having their inner arms connected by sliding joints formed by bending the ends of each around the arms of the other, substantially as described.

In testimony whereof I affix my signature in presence of two witnesses.

RADFORD MONROE REAMS.

Witnesses:
V. SANDERS,
J. FRED MURPHY.